Oct. 30, 1956    H. F. H. WIGTON    2,768,937
DISTILLATION OF VOLATILE MATTERS OF CARBONACEOUS MATERIALS
Filed May 8, 1952
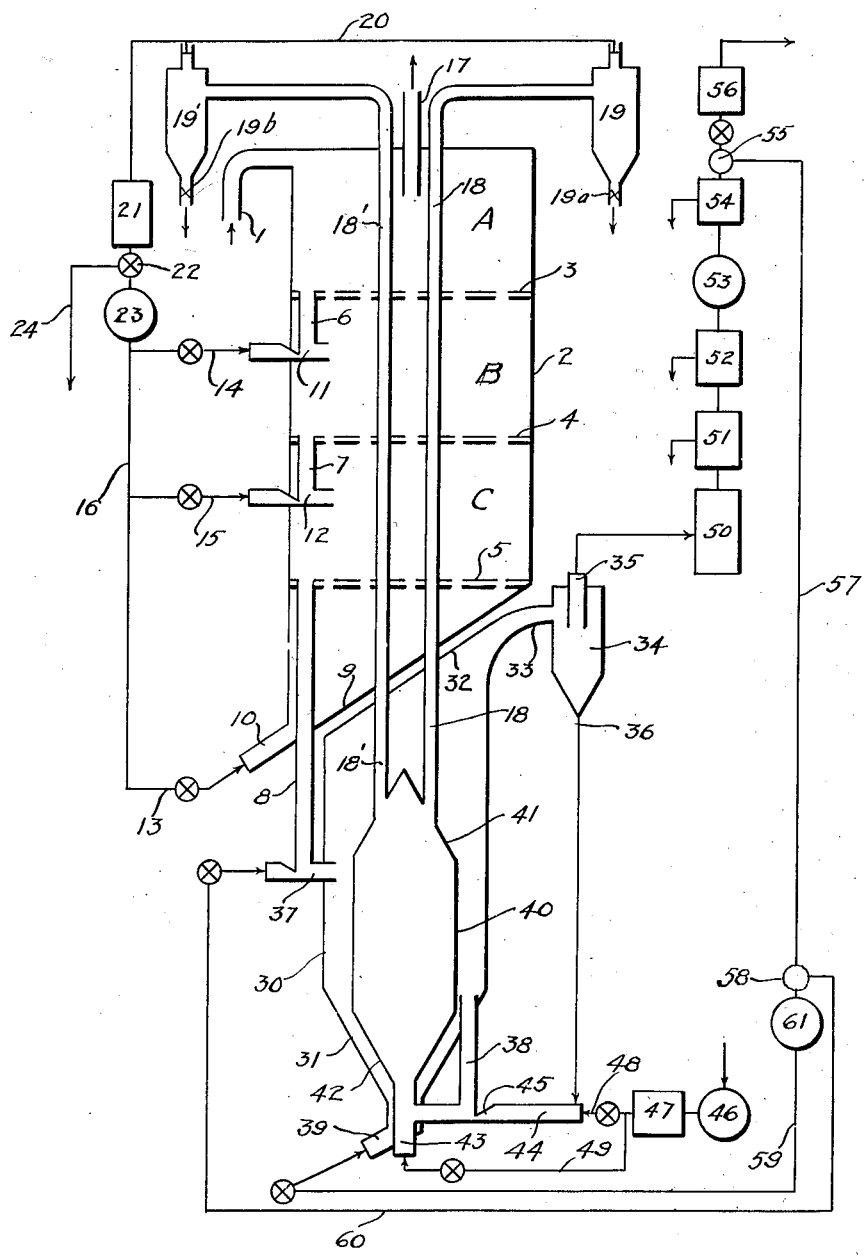
INVENTOR
HENRY WIGTON
BY Raymond J. Norton
ATTORNEY ical economies, and with minimum dilution
United States Patent Office 2,768,937
Patented Oct. 30, 1956

2,768,937

DISTILLATION OF VOLATILE MATTERS OF CARBONACEOUS MATERIALS

Henry F. H. Wigton, Boulder, Colo.

Application May 8, 1952, Serial No. 286,720

12 Claims. (Cl. 196—75)

This invention relates to the distillation of volatile matters from carbonaceous material, and, more particularly, to a method of treating non-agglomerating or non-caking mixtures of oil-bearing shales, coals, lignites, woods, and the like.

A major object of the invention is to devise a process by which such materials are carbonized in a single pass, in a continuous operation, without resorting to recycling of the solids.

Another salient object is to provide such a continuous operation in which a minimum of mechanical equipment is required.

A further important object of the invention is to effect the continuous distillation of volatile materials with high thermof the evolved volatile products.

A still further object of the invention is to utilize the solid starting materials as a heat transfer agent and coolant in particular steps of the process.

The fundamental concepts of the invention can be readily appreciated and technically evaluated from a consideration of a preferred operation invoking these concepts.

In order to clearly explain the invention, there is shown in the accompanying drawing, in diagrammatic form, the essential units of a plant in which the process is carried out. In order to simplify the drawings, certain of the units involved in the preliminary treatment of the carbonaceous starting material have been omitted, although such operation will be described.

As will be seen more fully hereinafter, the major steps of the process include grinding or pulverizing the carbonaceous material to the desired optimum size; conveying such particulate material, in a fluidized stream, through a carbonization zone in which the material is carbonized by indirect heat derived from a separate combustion zone, encased or enclosed by the carbonization zone; discharging solids, gases and vapors from the carbonization zone; separating such solids from vapors and gases; separately recovering the condensable vapors and non-condensable gases; and utilizing the separated solids, in fluidized form, as a fuel in the combustion zone. In operations involving, for example, lean shales, it is desirable to preheat the carbonaceous materials charged to the carbonizing zone. The operation is so designed as to reduce to a minimum the mixing of volatile products of the carbonization step with combustion gases to commensurately simplify the recovery of such volatile materials and heating gas produced therein. The heat required for the carbonization is essentially derived from the carbonization residues fed as fuel to the combustion zone.

A characteristic feature of the operation is that the solid materials passing through both the carbonization and combustion zones are in a special physical state, namely, in a turbulent suspended state, known as fluidized solids. It is to be observed that in these circumstances much higher coefficients of heat transfer are obtainable, and lower operating temperatures are permissible, than would be the case if only one or neither of the materials in these respective zones was fluidized. Likewise, by conveying the solids through the several unit operations in a fluidized state, that is, as a streaming entrainment of particulate solids carried in a pneumatic fluid, the material handling problem is greatly simplified. A particularly important feature of the invention, noted previously, is that the throughput of solids comprises a single throughput, requiring no recycling. As compared to distillation processes using hot gases, the process of the invention presents the marked advantage of evolving the volatile material with minimum dilution, and minimum solids decomposition or high temperature cracking.

The above and many other incidental advantages of the invention herein will readily be perceived from a consideration of a typical operation as depicted in the accompanying flow sheet:

The preliminary steps of pulverizing the shale, or other starting material, and classifying it to the desired mesh sizes, are unit operations which may readily be carried out by orthodox procedures, and in readily available, standard equipment. As noted, to simplify the drawings, these steps have not been included in the flow sheet, it being understood that these steps are performed either in the current throughput, or as an initial operation, to build up a stock pile of charge material for the novel operation. The particulate material charged to the process may vary in particle size, ranging from 28 to 300 mesh. The only essential limitation on the particle size is that it should be such as to be readily amenable to fluidization.

The shale, or other charge material, after being pulverized in a mill (not shown), is picked up and asported in a stream of gas, which, conveniently, may be flue gas from the subsequent process. This pick-up, or solids transfer, may be done in a conventional Fuller-Kenyon pump, and the fluidized solids stream is charged to the distillation and conversion system. As will be appreciated, the particulate raw material need not be charged to the heating equipment in the form of a fluidized solids stream, but may be conveyed as particulate solids through a screen conveyor, or equivalent mechanism, to the carbonization and combustion zones.

In one modification of the invention, as shown in the drawings, the carbonaceous charging stock is preheated prior to treatment in the carbonization zone. This preheating is particularly desirable where the charge stock is made up of leaner shales or material containing appreciable moisture. In the case of richer shales, little or no preheating is necessary.

The charge material passing through line 1 is fed into the upper end of a preheating vessel or standpipe 2. This structure is compartmented to form compartments A, B, and C, which are severally set up and established by the foraminous separators or grids 3, 4 and 5. Flow of the particulate charge material from the compartment A, and serially and gravimetrically through compartments B and C, is through the downcomer pipes 6 and 7. Discharge of charge material from compartment C is effected by gravity through downcomer pipe 8, which serves as a feeder line for the carbonization zone, as will be described more fully hereinafter. The bottom 9 of the preheating vessel 2 slopes downwardly, to one side, as indicated in the drawing, and is provided with a gas inlet 10. Downcomer pipes 6 and 7 are respectively provided with mixing nozzles 11 and 12. Valved feeder lines 13, 14 and 15, respectively connect elements 10, 11 and 12 with aerating flue gas line or header 16, whose function will be adverted to more in detail hereinafter. A flue gas vent 17 is provided at the top of segment A of unit 2, and one or more parallel discharge pipes 18, 18', extend vertically through the unit 2, and serve to conduct flue gases from the combustion zone 40, together with entrained fluidized combusted shale particles, and deliver them either into a header so that only one separator is required or to parallel vortical whirl separators 19, 19', severally discharging cleaned, hot flue gas to a common flue gas header or discharge line 20. The separators are provided with subjacent, valved burned shale outlets 19a, 19b, severally discharging to suitable receptacles, not shown. The flue gas header 20 is connected through cooler 21 and 2-way valve 22 to compressor 23 which is in fluid communication with gas header 16. A by-pass line 24 serves to vent excess or undesired flue gas.

As noted hereinabove, the preheated shale, or other carboniferous material, is subjected to a destructive distillation treatment, out of contact with the ultimate products of combustion, and the carboniferous residues of such treatment are fed, under pressure, into a central furnace or combustion chamber whose walls are in direct, heat-exchanging contact with the materials undergoing destructive distillation, in whole or in part, in the circumjacent carbonization zone.

The combination carbonizer and combustor of the present invention will be seen to comprise an outer, cylindrical vessel or shaft furnace 30, having a conical bottom 31, and a sloping top or roof 32, discharging through offtake 33 into a vortical whirl separator 34 having an axial cleaned gas discharge line 35, and a bottom, separated solids discharge line 36. An injector type inlet 37 is connected to preheated discharge line 8, and serves to introduce preheated carbonaceous solids tangentially into the furnace 30. A solids offtake line 38 embouches into the upper part of conical bottom 31, and is desirably positioned on the opposite side of furnace 30 from entrant 37 and at an appreciably lower level. An inlet 39 is provided at the tip of inverted conical bottom 31, and serves to introduce fluidizing gas, desirably recycled retort gases, into the furnace chamber to effect fluidization of the particulate solids therein.

The combustor unit of the system herein comprises an axially disposed cylindrical chamber or fire pot 40 having a conical top 41 and a conical bottom 42. The unit 40 is axially disposed in shaft furnace 30, and is preferably made of metal to insure maximum heat transfer to the fluidized solids in the circumjacent carbonization zone of the furnace. The offtake flues 18, 18' are embouched in the conical top 41 of the combustion chamber 40. A combustive air inlet line 43 is formed as a continuation of conical bottom 42, and this line has a lateral connection 44 in fluid communication with separated solids offtake line 38 of furnace 30. An injector nozzle 45 is incorporated in line 44 which is also in fluid communication with solids discharge line 36 of vortical whirl separator 34. A compressor 46 forces air through heater 47 (which may be in heat-exchanging relation with flue gas cooler 21) and thence through valved lines 48, 49 to solids feed line 44, and combustive air feed line 43, respectively.

The cleaned gas offtake 35 of separator 34 delivers vaporous products of the carbonization or destructive distillation of the shale, or other carbonaceous material, to a train of treating equipment comprising vapor treater 50, liquid condensers 51, 52, compressor 53 and light oil recovery unit 54 to dividing mechanism 55. The excess, high heating value gas, is suitably treated in unit 56 and vented to storage or a desired use installation. The required recycle gas for introducing preheated shale into the furnace 30 and maintaining it in fluidized condition therein is withdrawn from dividing mechanism 55 through line 57, and is passed through a second dividing mechanism 58, to be delivered, through valved lines 59 and 60 to the fluidizing gas inlet 39, and the solids feed line 37, respectively. A compressor 61 is desirably incorporated in line 59 to give the added pressure necessary to maintain the desired degree of fluidization in the carbonization chamber and force the entraining gaseous medium and contained vaporous and particulate solids constituents through the vortical whirl separator and the train of treating equipment to the booster compressor 53.

It will be seen that the hereinabove described system is eminently practical, yet simple in construction, maintenance and operation. As disclosed, it is particularly suited to the treatment of so-called lean shales, and makes full use of the waste heat of the process to preheat the material to be treated, with resulting economies in operation. Where richer shales and coal are to be processed, little or no preheating of the material to be treated would be required, and the waste heat can be used in waste heat boilers, space heater units, or in any suitable use device.

The invention comprehends the use of ground, raw shale or like material as a coolant for the mixtures of gases and vapors or the reflux oils for the liquid condensers. Such a cooler could, desirably, consist of a fluidized bed of shale surrounding a tube bundle, with the gases and vapors, or the reflux oil on the tube side. Such a system would be eminently desirable in localities where there is a dearth of coolant water. Under the conditions indicated, the shale would be preheated and the volatile products would be condensed.

To recapitulate, there has been shown and disclosed a novel apparatus and process for treating carbonaceous materials by destructive distillation, wherein the charge material is pretreated by the sensible heat entrained in and by gaseous products of combustion and accompanying solids; the preheated charge is destructively distilled or carbonized, out of contact with combustion gases and products, but in heat-exchanging relation therewith; the solid residues of the destructive distillation step are fed into a combustion zone in heat-transfer relation to the carbonization zone, and the distillation products are recovered, and an aliquot gaseous portion thereof is used as recycle gas for effecting feeding and fluidization of solids in the distillation zone.

While a preferred process and apparatus has been described, it is to be understood that this has been given merely to illustrate the underlying principles of the invention and not as limiting its useful scope to the particular procedure or apparatus described.

I claim:

1. An improved method of recovering volatile material from non-agglomerating material, such as shale, by low temperature carbonization in a single pass system which comprises, particulating the charge material, dense phase fluidizing the particulated material in a fluidizing medium, passing the fluidized charge at substantially uniform velocity upwardly through a distillation zone and heating it therein to temperatures sufficiently high to effect pyrolytic decomposition of the shale with the formation of carbonaceous gases and vapors and the deposition of liberated carbon on the mineral residues, and to distil off said resulting gases and vapors without substantial undesirable pyrolysis thereof, by heat applied indirectly from a combustion zone located centrally and wholly within the circumjacent distillation zone; withdrawing from the overhead products from the distillation zone unmixed with products from the combustion zone and separating the entrained solids from the gasiform carrier materials, then fractionating such gasiform materials to separate condensible and non-condensible fractions, separately withdrawing from the distillation zone the carbon-coated particulate solid residues, feeding such residues in fluidized form to the combustion zone together with combustive air and a fluidizing medium; combusting said solids in the combustion zone to burn off the carbon; withdrawing from the combustion zone the decarbonized particulate solid residue entrained in the gaseous products of combustion, separating the said solids from the gaseous combustion products and discharging separated solids from the system.

2. A method according to claim 1 in which a portion of the non-condensible overhead fraction from the distillation zone is employed as the fluidizing medium in the distillation and combustion zones.

3. A method according to claim 1 in which the particulate material passing to the distillation zone is fluidized with compressed solids-free combustion gases.

4. A method according to claim 1 in which heat is transferred from the combustion zone to the distillation zone through a metallic path.

5. A method according to claim 1 in which the flow of fluidized material in the distillation zone passes in counter-current direction to the flow of fluidized material in the combustion zone.

6. A method according to claim 1 in which the fluidized particulate material flowing to the distillation zone is preheated by indirect contact with hot gaseous products from the combustion zone.

7. A method according to claim 1 in which the particulate solids in both the distillation zone and the combustion zone are in dense phase fluidization.

8. A method according to claim 1 in which the overhead products from the distillation zone are cooled by indirect heat exchange with a fluidized bed of particulate carbonaceous material.

9. A method in accordance with claim 8 in which the carbonaceous materials used for cooling the overhead products from the distillation zone are utilized as a preheated feed to the distillation zone.

10. The improved method of low temperature carbonization of non-agglomerating mixture of carbonaceous materials such as shale having significant amounts of non-carbonaceous, residue-forming components, in a single pass system, comprising the steps of preparing a charge of the carbonaceous material in particulate form; contacting the particulate charge with a pressurized gaseous fluid, whereby the charge is suspended in the gaseous fluid to form a fluent, fluidized mass; passing the fluidized mass into a distillation zone in indirect heat-exchanging contact with a combustion zone, out of contact with the products of combustion, whereby the gaseous products of distillation are separated from the carboniferous residues; introducing a pressurized charge of fluidizing gas into the distillation zone concurrently with the charge, whereby the charge is maintained in a fluidized state, the carbonaceous residues are classified and discharged to the combustion zone; separating the gasiform distillation products into gases and vapors, and separately recovering same, a portion of the recovered gases being compressed and returned to the distillation step as fluidizing gas; introducing the carbonaceous residues from the distillation step into a combustion zone and in a stream of pressurized, primary combustive air, whereby the combustion charge is maintained in a fluidized state, the carbonaceous residues are combusted, and the substantially carbon-free residues of combustion are asported as a fluidized stream of solids in the gaseous products of combustion; separating the asported solids from the entraining gas stream removing the separated solids from the system; and returning at least a portion of the cleaned gas to the system as a preheating and carrier fluid for the initial charge of carbonaceous material.

11. A method according to claim 10, characterized by the fact that the charge material is preheated, under fluidizing conditions, by direct contact with a portion of the cleaned gas from the products of combustion.

12. A method according to claim 10, characterized by the fact that the gasiform products of distillation are preliminarily treated to remove asported fines, and the separated fines are fed to the combustion zone in the combustive air charge.

References Cited in the file of this patent

UNITED STATES PATENTS

| | | |
|---|---|---|
| Re. 17,181 | McEwen | Jan. 1, 1929 |
| 959,080 | Sheldon | May 24, 1910 |
| 1,704,956 | Trumble | Mar. 12, 1929 |
| 1,805,109 | Runge et al. | May 12, 1931 |
| 1,854,300 | Greene et al. | Apr. 19, 1932 |
| 1,955,025 | Sobel et al. | Apr. 17, 1934 |
| 1,984,380 | Odell | Dec. 18, 1934 |
| 2,131,702 | Berry | Sept. 27, 1938 |
| 2,342,622 | Fast | Feb. 22, 1944 |
| 2,445,327 | Keith | July 20, 1948 |
| 2,456,796 | Schutte | Dec. 21, 1948 |
| 2,480,670 | Peck | Aug. 30, 1949 |
| 2,543,884 | Weikart | Mar. 6, 1951 |
| 2,550,677 | Dalin et al. | May 1, 1951 |
| 2,582,712 | Howard | Jan. 15, 1952 |
| 2,588,076 | Gohr | Mar. 4, 1952 |

FOREIGN PATENTS

| | | |
|---|---|---|
| 584,386 | Great Britain | Jan. 14, 1947 |

OTHER REFERENCES

Godel: "Fluidization in making active carbon," Chemical Engineering, July, 1948, McGraw-Hill, pp. 110–111.